(12) United States Patent
Nider et al.

(10) Patent No.: US 10,824,466 B2
(45) Date of Patent: Nov. 3, 2020

(54) CONTAINER MIGRATION

(71) Applicant: International Business Machines Corporation, Armonk, NY (US)

(72) Inventors: Joel Kelly Nider, Zichron Yaakov (IL); Michael Rapoport, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 16/142,002

(22) Filed: Sep. 26, 2018

(65) Prior Publication Data

US 2020/0097323 A1 Mar. 26, 2020

(51) Int. Cl.
G06F 9/445 (2018.01)
G06F 9/48 (2006.01)
H04L 29/08 (2006.01)

(52) U.S. Cl.
CPC ............ G06F 9/4856 (2013.01); H04L 67/10 (2013.01)

(58) Field of Classification Search
CPC .................................................. G06F 9/4856
USPC .......................................................... 718/1
See application file for complete search history.

(56) References Cited

U.S. PATENT DOCUMENTS

| | | |
|---|---|---|
| 9,141,578 B2 | 9/2015 | Mashtizadeh et al. |
| 9,619,270 B2 | 4/2017 | Ramasubramanian et al. |
| 9,733,980 B1 | 8/2017 | Khan et al. |
| 9,893,977 B2 | 2/2018 | Johnsen et al. |

FOREIGN PATENT DOCUMENTS

WO   WO 2018/17 63 93   * 3/2019   ............ G06F 9/455

OTHER PUBLICATIONS

Hines, et al., "Post-Copy Live Migration of Virtual Machines," published in Operating Systems Review ·2000 pp. 13.
Huang, et al., "High Performance Virtual Machine Migration with RDMA over Modern Interconnects," , published in Cluster 2007, 2007 IEEE international conference on cluster computing, 2007, pp. 7.
Lesokhin, et al., "Page Fault Support for Network Controllers," ASPLOS 17, Apr. 8-12, 2017, China, pp. 18.
Liang, et al., "Swapping to Remote Memory over InfiniBand: An Approach using a High Performance Network Block Device," Published in: international conference on cluster computing · 2005, pp. 30.
Su, et al., "RPFF: A Remote Page-fault Filter for Post-copy Live Migration," published in: 2015 IEEE International Conference on Smart City/SocialCom/SustainCom (SmartCity), Dec. 1, 2015, pp. 6.

* cited by examiner

Primary Examiner — Timothy A Mudrick

(57) ABSTRACT

In some examples, a system for container migration can include a processor to detect a remote direct memory access (RDMA) enabled network interface controller that supports an on-demand paging feature within the system and within the target device. The processor can also detect a container to be migrated to the target device, the container comprising one or more processes being executed by the system. Additionally, the processor can implement migration procedures on the system and detect, via a kernel component of an operating system, a process identifier of each of the one or more processes to be migrated, wherein the operating system is stored in memory of the system. Furthermore, the processor can modify the system to transmit page fault data for each of the one or more processes migrated to the target device.

20 Claims, 8 Drawing Sheets

200

CONTAINER MIGRATION

BACKGROUND

The present disclosure relates to containers, and more specifically, but not exclusively, to migrating containers between devices.

SUMMARY

According to an embodiment described herein, a system for transmitting containers to a target device can include a processor to detect a remote direct memory access (RDMA) enabled network interface controller that supports an on-demand paging feature within the system and within the target device. The processor can also detect a container to be migrated to the target device, the container comprising one or more processes being executed by the system. In addition, the processor can implement migration procedures on the system and detect, via a kernel component of an operating system, a process identifier of each of the one or more processes to be migrated, wherein the operating system is stored in memory of the system. Moreover, the processor can modify the system to transmit page fault data for the one or more processes migrated to the target device, wherein modifying the system comprises initiating a transmission protocol and registering a memory region comprising a virtual address space of each of the one or more processes to be migrated to the target device.

In some embodiments, a system for receiving containers can include a processor to detect a remote direct memory access (RDMA) enabled network interface controller that supports an on-demand paging feature within the system and within a source device. The processor can also register a process identifier for one or more processes of a container migrated from the source device to the system. In addition, the processor can resume execution of the one or more processes of the container on the system and detect a memory page fault during execution of the one or more processes. Furthermore, the processor can send a message to the source device to retrieve missing data corresponding to the memory page fault and simultaneously map an empty memory page to a virtual address of the one or more processes that generated the memory page fault. Additionally, the processor can retrieve, via the RDMA enabled network interface controller, the missing data from the source device corresponding to the memory page fault. The processor can also execute the one or more processes based on the missing data from the source device.

In some embodiments, a method for receiving containers can include detecting a remote direct memory access (RDMA) enabled network interface controller that supports an on-demand paging feature within a system and within a source device and registering a process identifier for one or more processes of a container migrated from the source device to the system. The method can also include resuming execution of the one or more processes of the container on the system, detecting a memory page fault during execution of the one or more processes, and sending a message to the source device to retrieve missing data corresponding to the memory page fault and simultaneously map an empty memory page to a virtual address of the one or more processes that generated the memory page fault. Furthermore, the method can include retrieving, via the RDMA enabled network interface controller, the missing data from the source device corresponding to the memory page fault.

In addition, the method can include executing the one or more processes based on the missing data from the source device.

DETAILED DESCRIPTION

Figure 1A:
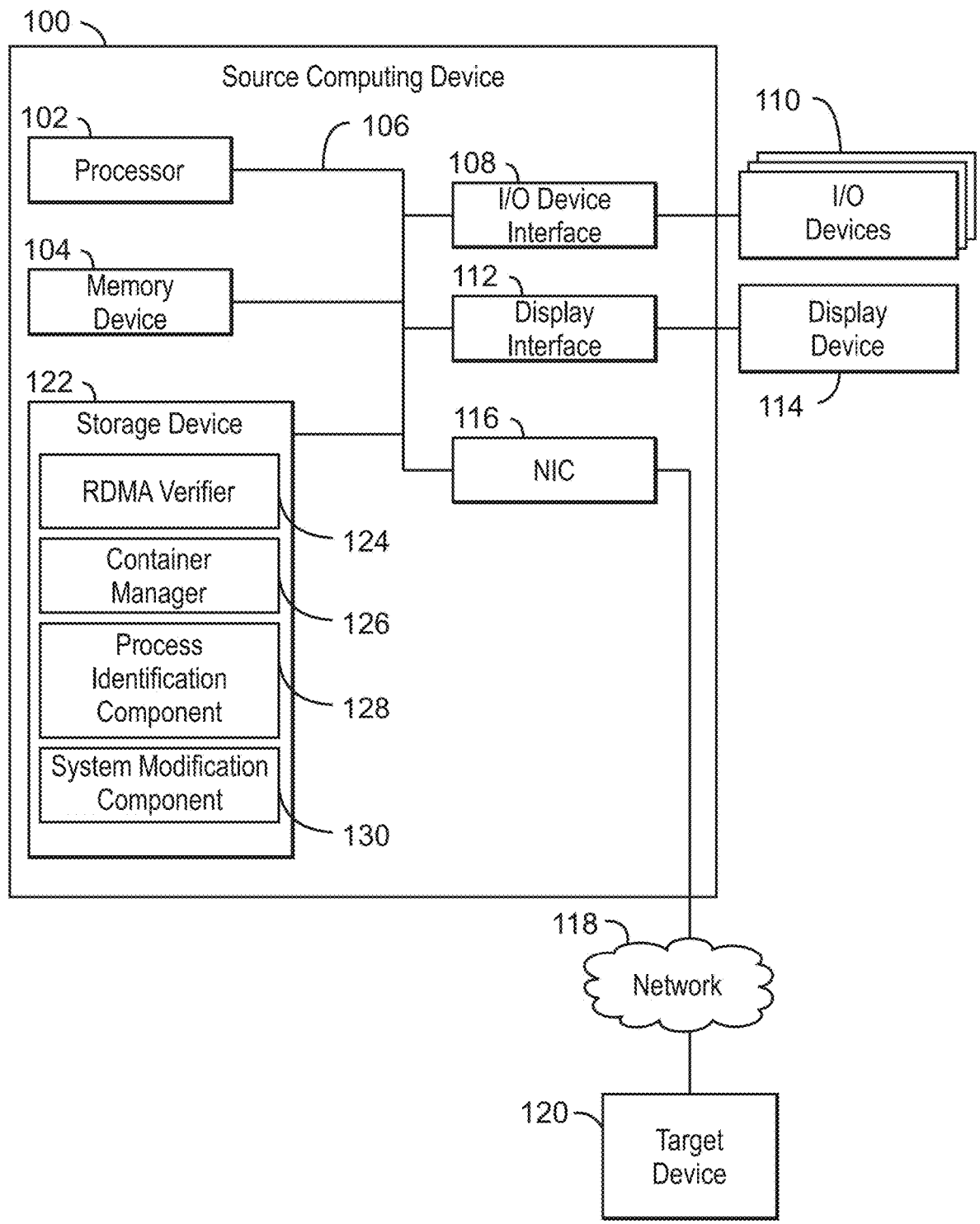
FIGS. 1A and 1B depict a block diagram of a source computing device and target device that can transmit or migrate a container according to an embodiment described herein.

Computing devices can implement operating-system level virtualization, which can enable an operating system of a computing device to execute any number of isolated user-space instances. In some examples, each user-space instance is referred to as a container that can include a separate operating system and/or any number of processes or applications. In some embodiments, each container can access resources of a computing device allocated to the container. Accordingly, each container can access a subset of resources of a computing device including memory devices, shared network drives, CPU power, hardware capabilities, peripheral devices, and the like. In some examples, each container can execute a separate operating system from a base operating system that can access all of the resources of a computing device.

In some embodiments, a computing device can execute any number of containers, which may utilize all of the resources of the computing device. For example, a computing device may execute a number of containers that utilize the existing memory of the computing device, utilize the CPU power, and the like. In some examples, the computing device can transmit one or more processes from any number of containers to a target device to free the hardware resources of the computing device. For example, transmitting or migrating one or more processes from a source computing device to a target device can result in additional unallocated memory space within the source computing device, or additional bandwidth for the CPU in the source computing device. In some embodiments, all of the processes of a container are migrated to a target device from a source computing device.

In some embodiments, a network interface controller (NIC) can be used for migrating a process from a container by transmitting data between two separate electronic devices using remote direct memory access (RDMA). The RDMA enabled NICs can transmit data from one device to another device without involving an operating system, a CPU, or a context switch. For example, the RDMA enabled NICs can implement zero-copy networking that enable transferring data directly from application memory of a first device to application memory of a second device. This can eliminate copying data between application memory and data buffers in an operating system.

In some embodiments, a source computing device can migrate a process from a container or an entire container using a remote direct memory access (RDMA) enabled network interface controller that supports an on-demand paging feature within the system and within the target device. On-demand paging, as referred to herein, is a virtual memory technique that copies a page of data into physical memory in response to an attempt to access the page of data. In some examples, the on-demand paging can include a target device attempting to access a page of data that has not yet been retrieved from a source computing device.

In some embodiments, the source computing device can also detect a container to be migrated to the target device, wherein the container can include one or more processes being executed by the target device. The container can be an application container, a system container, or any other suitable container. For example, the container can be an application container that executes any number of applications or processes or a system container that executes a separate operating system along with applications or processes.

In some embodiments, the source computing device can also implement migration procedures on the system and detect, via a kernel component of an operating system, a process identifier of each of the one or more processes to be migrated, wherein the operating system is stored in memory of the system. Furthermore, the source computing device can modify the system to transmit memory pages for the one or more processes migrated to the target device in response to an RDMA message sent by the target system following a page fault within the target system. In some embodiments, modifying the system comprises initiating a transmission protocol and registering a memory region comprising a virtual address space of each of the one or more processes to be migrated to the target device.

In some embodiments, a target device can detect a remote direct memory access (RDMA) enabled network interface controller that supports an on-demand paging feature within the source system. In some embodiments, the target device can also include an RDMA enabled network interface controller that supports an on-demand paging feature. The target device can also register a process identifier for one or more processes of a container migrated from the target device to the system and resume execution of the one or more processes of the container on the system. Additionally, the target device can detect a memory page fault during execution of the one or more processes and send a message to the target device to retrieve missing data corresponding to the memory page fault and simultaneously map an empty memory page to a virtual address of the one or more processes that generated the memory page fault. The target device can also retrieve, via the RDMA enabled network interface controller, the missing data from the target device corresponding to the memory page fault, and execute the one or more processes based on the missing data from the target device.

Accordingly, the techniques described herein can migrate one or more processes executed by a container of a first device to a second device. The techniques described herein can utilize RDMA enabled NICs and on-demand paging to bypass CPU utilization during the migration of the processes. Therefore, the techniques herein can migrate processes between multiple devices while reducing latency and CPU load.

With reference now to FIG. 1A, an example source computing device is described that can transmit or migrate a container to a target device. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as an RDMA protocol, among others. The network 118 may be a cellular network, a radio network, a wide area network (WAN), a local area network (LAN), or the Internet, among others. A target device 120 may connect to the computing device 100 through the network 118.

The processor 102 may also be linked through the system interconnect 106 to a storage device 122 that can include a hard drive, an optical drive, a USB flash drive, an array of drives, or any combinations thereof. In some examples, the storage device 122 may include data used to execute instructions by the processor 102. In some examples, the storage device 122 can include a RDMA verifier 124 that can detect a remote direct memory access (RDMA) enabled network interface controller that supports an on-demand paging feature within the system and within the target device. In some examples, the storage device 122 can also include a container manager 126 that can detect a container to be migrated to the target device, the container comprising one or more processes being executed by the system. The container manager 126 can also implement migration procedures on the system. Additionally, the storage device 122 can include a process identification component 128 that can detect, via a kernel component of an operating system, a process identifier of each of the one or more processes to be migrated, wherein the operating system is stored in memory of the system. Furthermore, the storage device 122 can include a system modification component 130 that can modify the system to transmit page fault data for the one or more processes migrated to the target device, wherein modifying the system comprises initiating a transmission protocol and registering a memory region comprising a virtual address space of each of the one or more processes to be migrated to the target device.

Figure 1B:
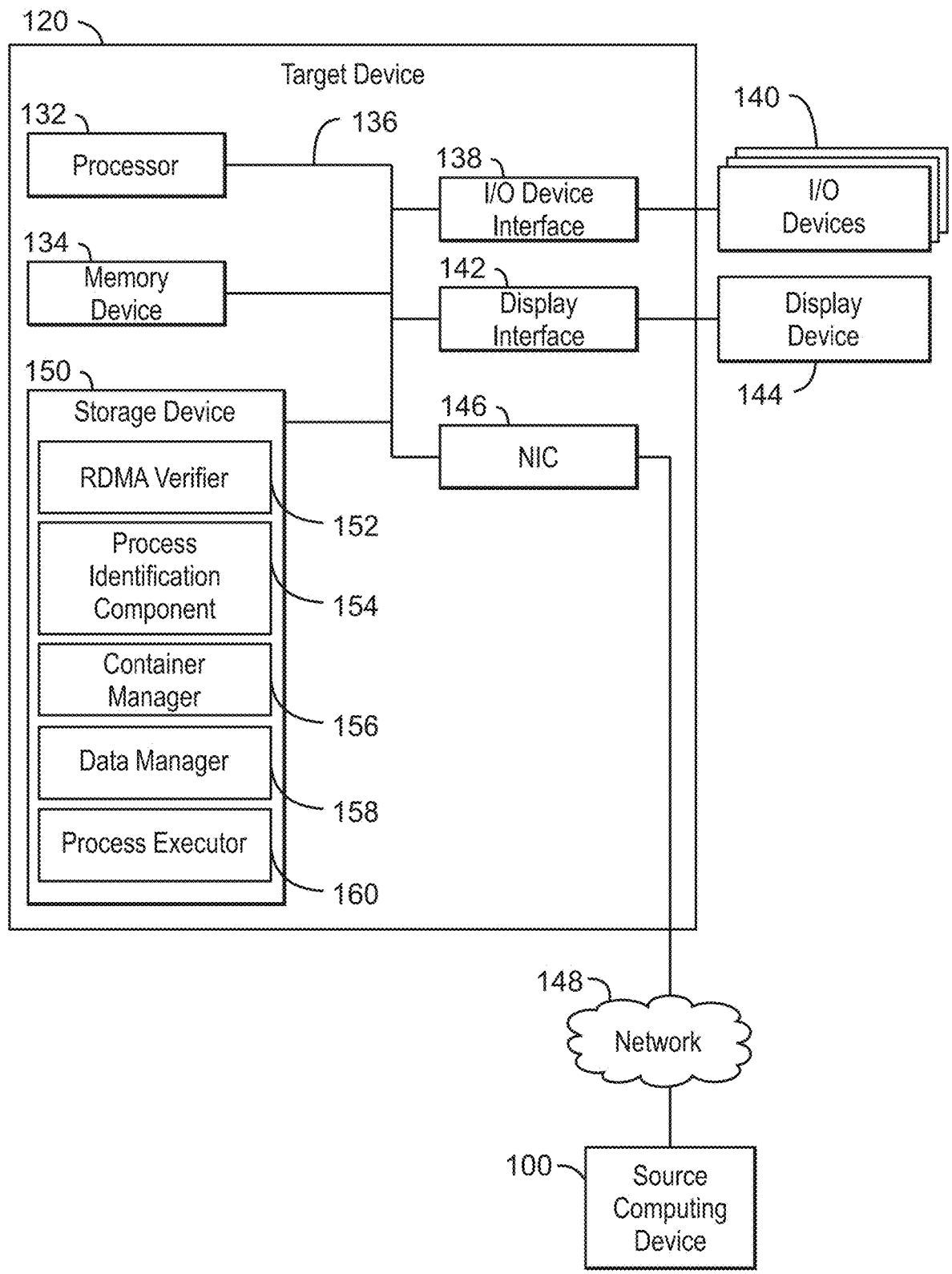

With regard to FIG. 1B, the target device 120 can be for example, a server, desktop computer, laptop computer, tablet computer, or smartphone. In some examples, target device 120 may be a cloud computing node. Target device 120 may be described in the general context of computer system executable instructions, such as program modules, being executed by a computer system. Generally, program modules may include routines, programs, objects, components, logic, data structures, and so on that perform particular tasks or implement particular abstract data types. Target device 120 may be practiced in distributed cloud computing environments where tasks are performed by remote processing devices that are linked through a communications network. In a distributed cloud computing environment, program modules may be located in both local and remote computer system storage media including memory storage devices.

The target device 120 may include a processor 132 that is adapted to execute stored instructions, a memory device 132 to provide temporary memory space for operations of said instructions during operation. The processor can be a single-core processor, multi-core processor, computing cluster, or any number of other configurations. The memory 134 can include random access memory (RAM), read only memory, flash memory, or any other suitable memory systems.

The processor 132 may be connected through a system interconnect 136 (e.g., PCI®, PCI-Express®, etc.) to an input/output (I/O) device interface 138 adapted to connect the target device 120 to one or more I/O devices 140. The I/O devices 140 may include, for example, a keyboard and a pointing device, wherein the pointing device may include a touchpad or a touchscreen, among others. The I/O devices 140 may be built-in components of the target device 120, or may be devices that are externally connected to the target device 120.

The processor 132 may also be linked through the system interconnect 136 to a display interface 142 adapted to connect the target device 120 to a display device 144. The display device 144 may include a display screen that is a built-in component of the target device 120. The display device 144 may also include a computer monitor, television, or projector, among others, that is externally connected to the target device 120. In addition, a network interface controller (NIC) 146 may be adapted to connect the target device 120 through the system interconnect 136 to the network 148. In some embodiments, the NIC 146 can transmit data using any suitable interface or protocol, such as the internet small computer system interface, among others. The network 148 may be a cellular network, a radio network, a wide area network (WAN), a local area network (LAN), or the Internet, among others. The target device 120 may connect to the source computing device 100 through the network 148.

The processor 132 may also be linked through the system interconnect 136 to a storage device 150 that can include a hard drive, an optical drive, a USB flash drive, an array of drives, or any combinations thereof. In some examples, the storage device 150 may include data used to execute instructions by the processor 132. In some examples, the storage device 150 can include a RDMA verifier 152 to detect a remote direct memory access (RDMA) enabled network interface controller that supports an on-demand paging feature within the system and within a target device. The storage device 150 can also include a process identification component 154 to register a process identifier for one or more processes of a container migrated from the target device to the system. In addition, the storage device 150 can include a container manager 156 that can resume execution of the one or more processes of the container on the system and detect a memory page fault during execution of the one or more processes. In some embodiments, the container manager 156 can also send a message to the target device to retrieve missing data corresponding to the memory page fault and simultaneously map an empty memory page to a virtual address of the one or more processes that generated the memory page fault. In some embodiments, the storage device 150 can include a data manager 158 that can retrieve, via the RDMA enabled network interface controller, the missing data from the target device corresponding to the memory page fault. Furthermore, the storage device 150 can include a process executor 160 that can execute the one or more processes based on the missing data from the target device.

It is to be understood that the block diagram of FIG. 1 is not intended to indicate that the source computing device 100 and the target device 120 are to include all of the components shown in FIG. 1. Rather, the source computing device 100 and the target device 120 can include fewer or additional components not illustrated in FIG. 1 (e.g., additional memory components, embedded controllers, modules, additional network interfaces, etc.). Furthermore, any of the functionalities of the RDMA verifier 124, container manager 126, process identification component 128, system modification component 130, RDMA verifier 152, process identification component 154, container manager 156, data manager 158, and process executor 160 are partially, or entirely, implemented in hardware and/or in the processor 102 or processor 132. For example, the functionality may be implemented with an application specific integrated circuit, logic implemented in an embedded controller, or in logic implemented in the processor 102 or processor 132, among others. In some embodiments, the functionalities of the RDMA verifier 124, container manager 126, process identification component 128, system modification component 130, RDMA verifier 152, process identification component 154, container manager 156, data manager 158, and process executor 160 can be implemented with logic, wherein the logic, as referred to herein, can include any suitable hardware (e.g., a processor, among others), software (e.g., an application, among others), firmware, or any suitable combination of hardware, software, and firmware.

Figure 2:
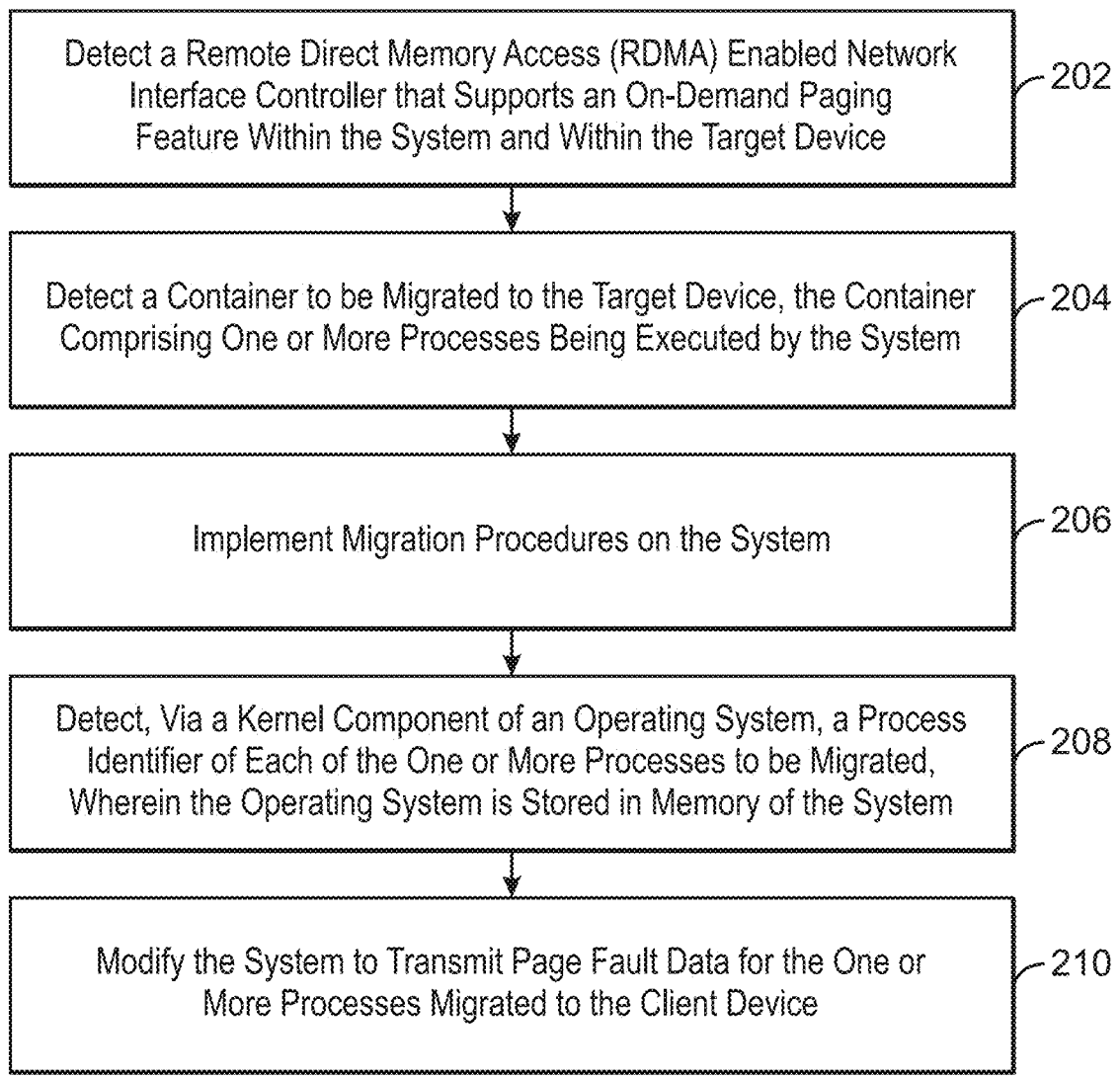
FIG. 2 is a process flow diagram of an example method that can transmit a container to a target device according to an embodiment described herein.

FIG. 2 is a process flow diagram of an example method that can migrate a process from a source computing device to a target device. The method 200 can be implemented with any suitable computing device, such as the computing device 100 of FIG. 1A. In some embodiments, the method 200 can be implemented with a node in a supercomputer, a server providing a remote service, a desktop computer device, or a mobile device, among others.

At block 202, the RDMA verifier 124 can detect a remote direct memory access (RDMA) enabled network interface controller that supports an on-demand paging feature within the system and within the target device. In some embodiments, the RDMA verifier 124 can enable a network interface controller of the source device to transmit data directly to a network interface controller of a target device using remote direct memory access (RDMA). The RDMA enabled NICs can transmit data from one device to another device without involving an operating system, a CPU, or a context switch. In some embodiments, the RDMA enabled NICs can implement zero-copy networking that enable transferring data directly from application memory of a first device to application memory of a second device. This can eliminate copying data between application memory and data buffers in an operating system.

At block 204, the container manager 126 can detect a container to be migrated to the target device, the container comprising one or more processes being executed by the system. In some embodiments, the container can include an operating system and any number of processes. The container can utilize memory space mapped to virtual memory addresses reserved for the container. Accordingly, the container can execute processes in an isolated environment without access to resources available to other containers or a base operating system that manages all of the hardware resources for a device. In some examples, a subset of the processes of a container can be migrated to a target device. In other examples, all of the processes of a container can be migrated to a target device. In some embodiments, the container manager 126 can detect that one or more processes are to be migrated to a target device in response to user input, hardware utilization exceeding a predetermined threshold, or based on a request received from the target device, among others. In some examples, the hardware utilization triggering a migration of a process to a target device can correspond to memory usage of a source device, CPU utilization of the source device, GPU utilization of the source device, a transmission bus utilization within the source device, and the like.

At block 206, the container manager 126 can also implement migration procedures on the system. In some examples, the migration procedures include suspending the one or more processes of the container and determining the target device is to receive the page fault data corresponding to migration of the one or more processes. The migration procedures can also include transferring context data comprising a runtime stack, register values corresponding to the one or more processes, and a list of open files. In some embodiments, the suspension of the processes in the container being migrated can include a post-copy memory migration technique that suspends a CPU state, registers, and non-pageable memory. For example, the container manager 126 can migrate a process to a target device using on-demand paging. As discussed above, on-demand paging, as referred to herein, is a virtual memory technique that copies a page of data into physical memory in response to an attempt to access the page of data. Accordingly, the target device can begin executing the process following the suspension of the process on the source device. The process in execution on the target device can generate a page fault when attempting to request data that has not been transferred from the source device to the target device. As described in greater detail below in relation to FIG. 3, the target device can request the missing data corresponding to the page fault from the source device. The source device can transfer requested data in memory to the target device in response to the request from the target device.

At block 208, the process identification component 128 can also detect, via a kernel component of an operating system, a process identifier of each of the one or more processes to be migrated, wherein the operating system is stored in memory of the system. In some examples, the process identifier can be assigned by the base operating system of the source device or the operating system included in a container that is executing the process. The process identifier can be used in a function call corresponding to the migration of the process from the source computing device to the target device. In some embodiments, the process identification component 128 can also identify thread identifiers associated with a process identifier. The threads can indicate sequences of instructions executed by the process independently from one another. In some examples, the process identification component 128 can include a scheduler that manages the execution of the threads and the processes in the container. The scheduler can identify pages of data to be migrated to a target device based on data included in a request for the missing data from the target device.

In some embodiments, the containers to be migrated are executed in the user-space of an operating system (utilities, libraries, etc.). Accordingly, in some examples, the containers do not include a kernel or drivers. Rather, the containers can rely on a host operating system for the kernel and driver functionalities. In some embodiments, the scheduler is part of the kernel of the host operating system and is not included in the container. The scheduler can select which thread is to be executed on which CPU core. The scheduler may not handle memory management. In some embodiments, each process is given its own virtual memory space, which is divided into a set of pages. The CPU can maintain a set of page tables for each process, which determines the mapping of virtual addresses (belonging to the particular process) and physical addresses (unique per physical machine). During migration of a process from a container, the virtual memory space is also migrated, so the virtual address on the source machine can be the same on the target machine. These page tables can remain valid as long as the process exists on the source device (even in a suspended state). When there is a page fault at that virtual address on the target device, the virtual address is used in the RDMA request. That virtual address is then translated by the NIC on the source device using the page tables belonging to the particular process. These mappings are unique to the process identifier and source device. The NIC can determine or look up the virtual address itself, and then use the NIC's built-in DMA engine to copy the contents of the corresponding physical page from the main memory to the NICs internal buffer. The contents of the physical page can then be packaged as an RDMA response, and returned to the target machine.

In some embodiments, the registration process is the method by which the NIC gains access to the page tables of a particular process. In some examples, the NIC builds its own equivalent set of page tables, and does not use the copy of data that belongs to the CPU directly. The NICs driver can program the NIC with all of the virtual to physical mappings for a particular PID (process identifier). When a request is received from a target device, the request contains the information needed such as a process identifier and a virtual address. Using these two fields together allows the NIC to look up the corresponding physical address and read the contents of that page through DMA. In some embodiments, an on-demand paging (ODP) feature of a NIC does not do all of the memory mappings ahead of time, but rather on-demand. Accordingly, the NIC has permission to access a certain range of addresses for a particular PID. In some embodiments, the lookup happens when the page is accessed for the first time.

At block 210, the system modification component 130 can modify the system to transmit memory pages corresponding to page fault data for the one or more processes migrated to the target device. In some embodiments, modifying the system includes initiating a transmission protocol and registering a memory region. In some examples, the memory region can include a virtual address space of each of the one or more processes to be migrated to a target device from a source device. In some examples, the transmission protocol can include an Ethernet or Infiniband protocol, among others. In some embodiments, the transmission protocol can include a RDMA queue pair indicating a reliable connection and a connected type.

In some embodiments, the RDMA queues correspond to data transmitted by a NIC. For example, the NIC can determine how many data items are in the queues. In some examples, one queue includes data to be sent and another queue includes data to be received. In some embodiments, the different modes of operation (reliable, connected) dictate a set of rules to be used by the NIC such as how long the NIC is to store received data, and what to do if data is not sent or received correctly.

The process flow diagram of FIG. 2 is not intended to indicate that the operations of the method 200 are to be executed in any particular order, or that all of the operations of the method 200 are to be included in every case. In some embodiments, the method 200 includes executing non-destructive instructions using an out-of-order execution technique. For example, the method 200 can include detecting a range of memory addresses to exclude from migration between a source device and a target device. The range of memory addresses to exclude from a virtual memory space of a source device can correspond to invalid memory addresses or previously transmitted memory addresses. For example, memory addresses previously migrated or transmitted to a target device from a source device can be excluded from subsequent transfers.

Figure 3:
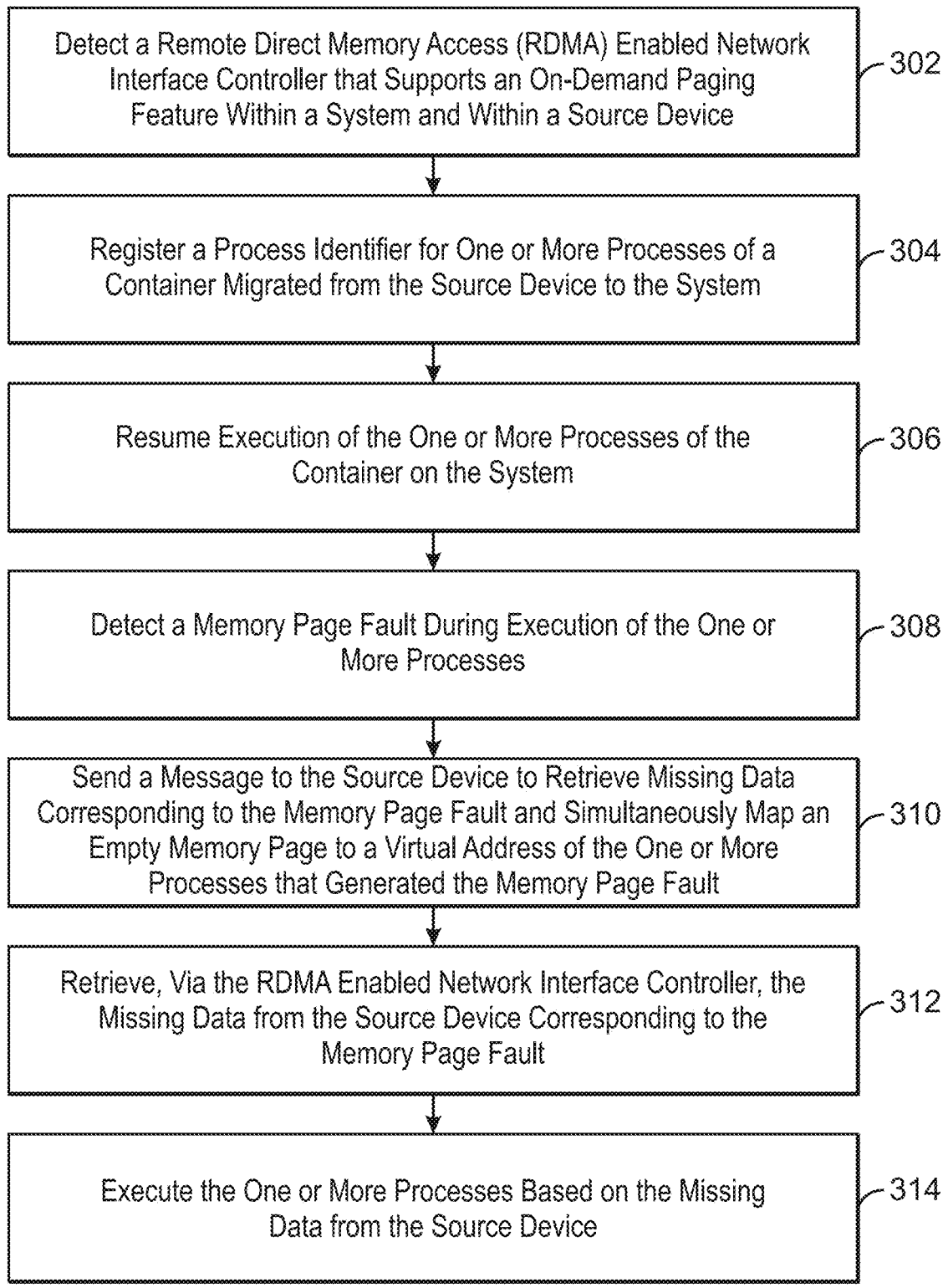
FIG. 3 is a process flow diagram of an example method that can receive a container from a source device according to an embodiment described herein.

FIG. 3 is a process flow diagram of an example method that can receive a process transmitted from a source computing device to a target device. The method 300 can be implemented with any suitable computing device, such as the target device 120 of FIG. 1B. In some embodiments, the method 300 can be implemented with any system such as a node in a supercomputer, a server providing a remote service, a desktop computer device, or a mobile device.

At block 302, the RDMA verifier 152 can detect a remote direct memory access (RDMA) enabled network interface controller that supports an on-demand paging feature within a source device and within a target device. The RDMA verifier 152 can enable a network interface controller of a target device to transmit data directly to a network interface controller of a source device using remote direct memory access (RDMA). The RDMA enabled NICs can transmit data from one device to another device without involving an operating system, a CPU, or a context switch.

At block 304, the process identification component 154 can register a process identifier for one or more processes of a container migrated from the source device to the target device or system. The process identification component 154 can capture the page faults for the one or more processes of the migrated container based on the process identifiers. The process identification component 154 can detect a virtual address for each process identifier and send an RDMA read request that includes the process identifier and the virtual address to the source system. In some embodiments, the process identification component 154 can generate a remote key that is sent to the source device with each request for missing data.

At block 306, the container manager 156 can resume execution of the one or more processes of the container on the target device or system. For example, the container manager 156 can enable a container in the target device to execute one or more processes migrated from a source device with a subset of the memory pages associated with the processes. In some examples, the container manager 156 can restore contextual information for the processes such as process identifiers, memory page ranges, open files, and open network sockets, among others.

At block 308, the container manager 156 can detect a memory page fault during execution of the one or more processes. In some embodiments, the memory page fault can indicate that a memory page with data to be used to execute a process has not been migrated from the source device to the target device.

At block 310, the container manager 156 can send a message to the source device to retrieve missing data corresponding to the memory page fault and simultaneously map an empty memory page to a virtual address of the one or more processes that generated the memory page fault. The message can include a remote key and process identifier corresponding to the process being executed by the target device. In some embodiments, the container manager 156 can initiate a transmission protocol to receive the missing data associated with the one or more processes from the source device. The transmission protocol can include an Ethernet protocol, or an Infiniband protocol, among others. In some examples, the container manager 156 can determine a transmission connection corresponding to the transmission protocol and the process identifier for the one or more processes that generated the memory page fault.

At block 312, the data manager 158 can retrieve, via the RDMA enabled network interface controller, the missing data from the source device corresponding to the memory page fault. In some embodiments, the data manager 158 can mark the memory page fault as addressed in response to receiving the missing data from the source device. At block 314, the process executor 160 can execute the one or more processes based on the missing data from the source device.

The process flow diagram of FIG. 3 is not intended to indicate that the operations of the method 300 are to be executed in any particular order, or that all of the operations of the method 300 are to be included in every case. In some embodiments, the method 300 includes executing non-destructive instructions using an out-of-order execution technique. In some embodiments, the method 300 can include modifying an operating system to include a page fault mechanism that generates a notification of the memory page fault. In some embodiments, the method 300 can also include registering the empty memory page.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
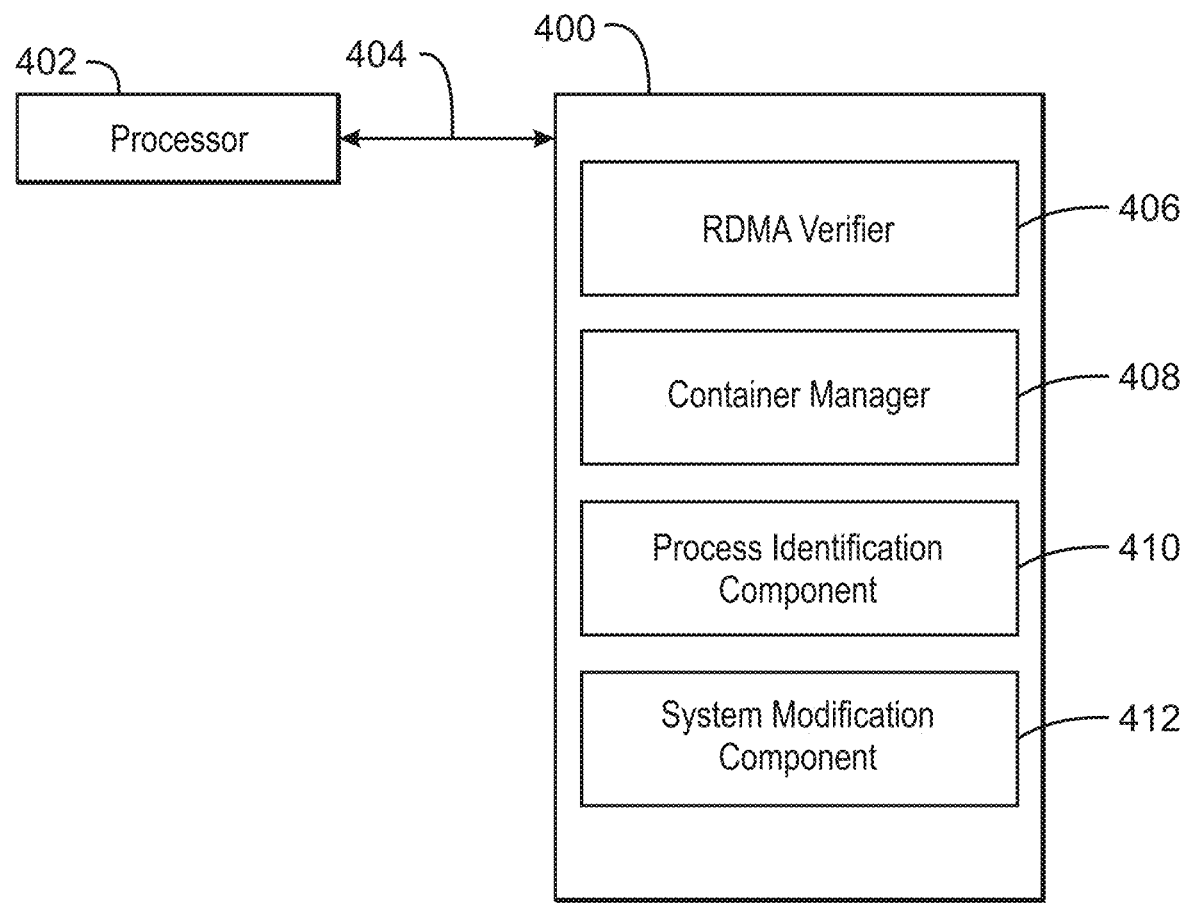
FIG. 4 is a tangible, non-transitory computer-readable medium that can transmit a container to a target device according to an embodiment described herein.

Referring now to FIG. 4, a block diagram is depicted of an example of a tangible, non-transitory computer-readable medium that can transmit or migrate a container between a source device and a target device. The tangible, non-transitory, computer-readable medium 400 may be accessed by a processor 402 over a computer interconnect 404.

Furthermore, the tangible, non-transitory, computer-readable medium 400 may include code to direct the processor 402 to perform the operations of the current method. For example, a RDMA verifier 406 can detect a remote direct memory access (RDMA) enabled network interface controller that supports an on-demand paging feature within the system and within the target device. In some examples, a container manager 408 can detect a container to be migrated to the target device, the container comprising one or more processes being executed by the system. The container manager 408 can also implement migration procedures on the system. Additionally, a process identification component 410 can detect, via a kernel component of an operating system, a process identifier of each of the one or more processes to be migrated, wherein the operating system is stored in memory of the system. Furthermore, a system modification component 412 can modify the system to transmit page fault data for the one or more processes migrated to the target device, wherein modifying the system comprises initiating a transmission protocol and registering a memory region comprising a virtual address space of each of the one or more processes to be migrated to the target device.

It is to be understood that any number of additional software components not shown in FIG. 4 may be included within the tangible, non-transitory, computer-readable medium 400, depending on the specific application. Furthermore, fewer software components than those shown in FIG. 4 can be included in the tangible, non-transitory, computer-readable medium 400.

Figure 5:
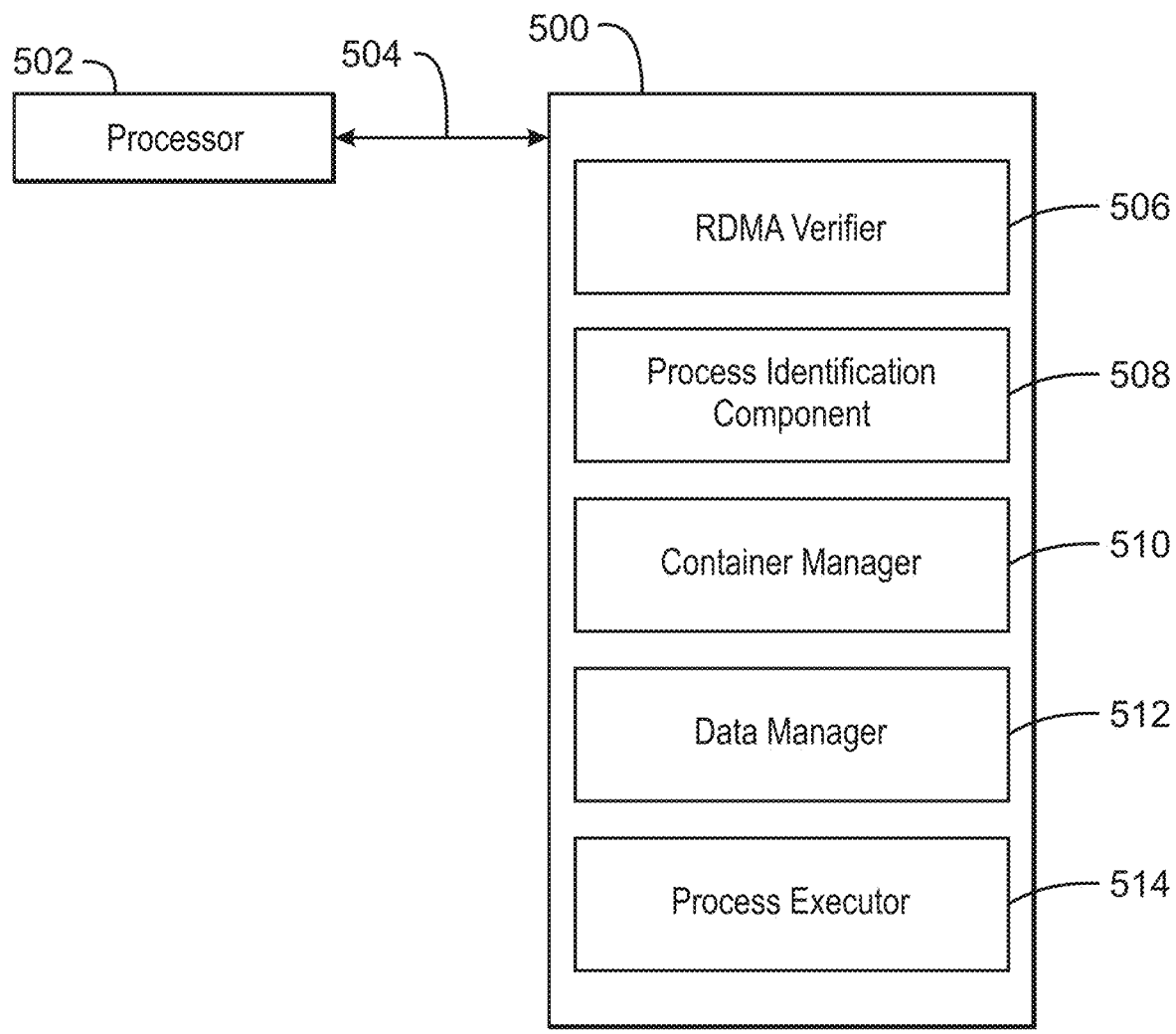
FIG. 5 is a tangible, non-transitory computer-readable medium that can receive a container from a source device according to an embodiment described herein.

Referring now to FIG. 5, a block diagram is depicted of an example of a tangible, non-transitory computer-readable medium that can transmit or migrate a container between a source device and a target device. The tangible, non-transitory, computer-readable medium 500 may be accessed by a processor 502 over a computer interconnect 504.

Furthermore, the tangible, non-transitory, computer-readable medium 500 may include code to direct the processor 502 to perform the operations of the current method. For example, a RDMA verifier 506 can detect a remote direct memory access (RDMA) enabled network interface controller that supports an on-demand paging feature within the system and within a source device. In some examples, a process identification component 508 can register a process identifier for one or more processes of a container migrated from the source device to the system. In addition, a container manager 510 can resume execution of the one or more processes of the container on the system and detect a memory page fault during execution of the one or more processes. In some embodiments, the container manager 510 can also send a message to the source device to retrieve missing data corresponding to the memory page fault and simultaneously map an empty memory page to a virtual address of the one or more processes that generated the memory page fault. In some embodiments, a data manager 512 can retrieve, via the RDMA enabled network interface controller, the missing data from the source device corresponding to the memory page fault. Furthermore, a process executor 514 can execute the one or more processes based on the missing data from the source device.

It is to be understood that any number of additional software components not shown in FIG. 5 may be included within the tangible, non-transitory, computer-readable medium 500, depending on the specific application. Furthermore, fewer software components than those shown in FIG. 5 can be included in the tangible, non-transitory, computer-readable medium 500.

Figure 6:
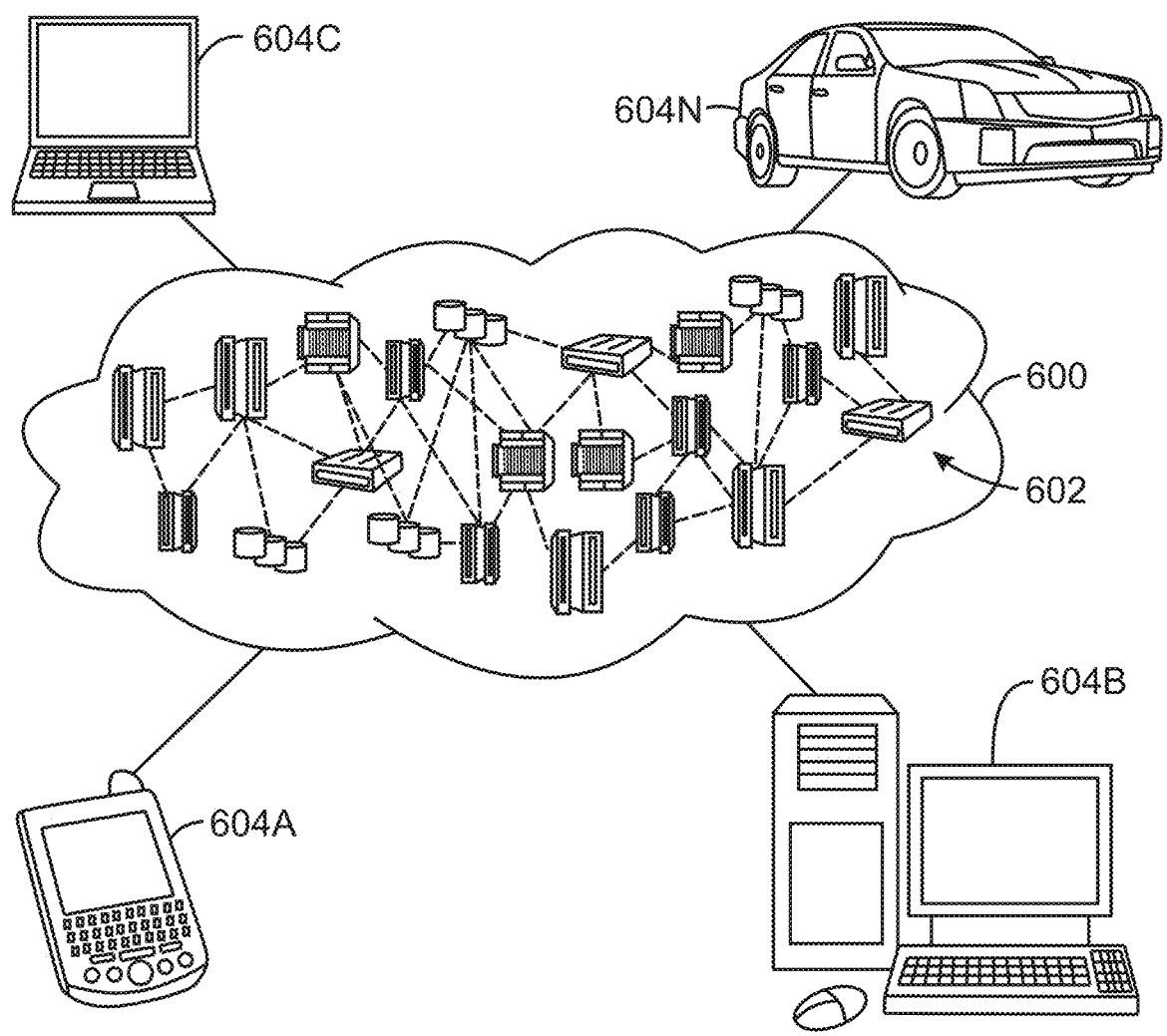
FIG. 6 depicts an illustrative cloud computing environment according to an embodiment described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
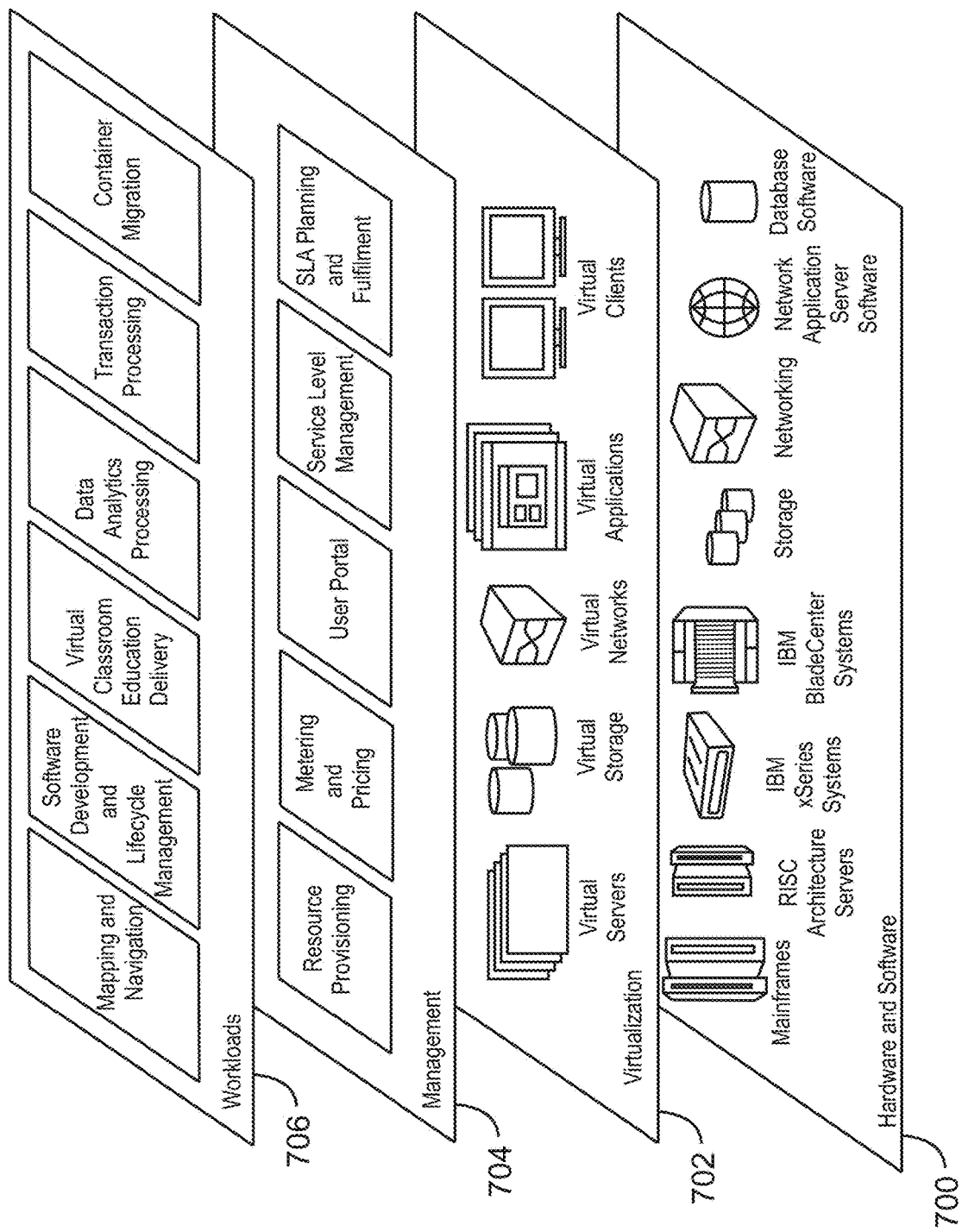
FIG. 7 depicts a set of functional abstraction layers provided by a cloud computing environment according to an embodiment described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and container migration.

The descriptions of the various embodiments of the present invention have been presented for purposes of illustration, but are not intended to be exhaustive or limited

What is claimed is:

1. A system for transmitting containers to a target device comprising:
a remote direct memory access (RDMA) enabled network interface controller (NIC) that supports an on-demand paging feature; and
a processor to:
detect a container to be migrated to the target device, the container comprising one or more processes being executed by the system;
implement migration procedures on the system, wherein the migration procedures comprise migrating a virtual address space of each of the one or more processes from the source machine to the target machine;
detect, via a kernel component of an operating system, a process identifier of each of the one or more processes to be migrated, wherein the operating system is stored in memory of the system; and
modify the system to transmit page fault data for the one or more processes migrated to the target device, wherein modifying the system comprises initiating a transmission protocol and registering a memory region comprising the virtual address space of each of the one or more processes to be migrated to the target device;
wherein the RDMA enabled NIC comprises memory that stores a page table for each of the one or more processes;
wherein the RDMA enabled NIC is to receive an RDMA request from the target device in response to a page fault on the target device, the RDMA request comprising the process identifier of the process that generated the page fault and one or more virtual addresses associated with the page fault; and
wherein, in response to the RDMA request, the RDMA enabled NIC is to translate the one or more virtual addresses to corresponding physical addresses using the page table corresponding to the received process identifier, access contents of the corresponding physical addresses, and send the contents to the target machine as an RDMA response.

2. The system of claim 1, wherein the migration procedures comprise:
suspending the one or more processes of the container;
determining the target device is to receive the page fault data corresponding to migration of the one or more processes; and
transferring context data comprising a runtime stack, register values corresponding to the one or more processes, and a list of open files.

3. The system of claim 1, wherein the transmission protocol comprises an Ethernet protocol or an Infiniband protocol.

4. The system of claim 3, wherein the transmission protocol comprises a RDMA queue pair indicating a reliable connection and a connected type.

5. The system of claim 1, wherein the processor is to exclude a range of memory addresses from the virtual address space, the range of memory addresses corresponding to invalid memory addresses or previously transmitted memory addresses.

6. The system of claim 1, wherein the system is a node in a supercomputer, a server providing a remote service, a desktop computer device, or a mobile device.

7. A system for receiving containers comprising:
a processor to:
detect a remote direct memory access (RDMA) enabled network interface controller that supports an on-demand paging feature within the system and within a source device;
register a process identifier for one or more processes of a container migrated from the source device to the system;
receive a migration of a virtual address space of each of the one or more processes from the source machine to the system;
resume execution of the one or more processes of the container on the system;
detect a memory page fault during execution of the one or more processes;
send a message to the source device to retrieve missing data corresponding to the memory page fault and simultaneously map an empty memory page to a virtual address of the one or more processes that generated the memory page fault, wherein the message comprises the process identifier of the process that generated the memory page fault and one or more virtual addresses associated with the memory page fault;
retrieve, via the RDMA enabled network interface controller, the missing data from the source device corresponding to the memory page fault, wherein the source device translates the one or more virtual addresses associated with the memory page fault to physical addresses of the source device; and
execute the one or more processes based on the missing data from the source device.

8. The system of claim 7, wherein the processor is to modify an operating system to include a page fault mechanism that generates a notification of the memory page fault.

9. The system of claim 7, wherein the processor is to register the empty memory page.

10. The system of claim 7, wherein the processor is to mark the memory page fault as addressed in response to receiving the missing data from the source device.

11. The system of claim 7, wherein the processor is to initiate a transmission protocol to receive the missing data associated with the one or more processes from the source device.

12. The system of claim 11, wherein the processor is to determine a transmission connection corresponding to the transmission protocol and the process identifier for the one or more processes that generated the memory page fault.

13. The system of claim 7, wherein the system is a node in a supercomputer, a server providing a remote service, a desktop computer device, or a mobile device.

14. A method for receiving containers comprising:
detecting a remote direct memory access (RDMA) enabled network interface controller that supports an on-demand paging feature within a system and within a source device;
registering a process identifier for one or more processes of a container migrated from the source device to the system;

receiving a migration of a virtual address space of each of the one or more processes from the source machine to the system;

resuming execution of the one or more processes of the container on the system;

detecting a memory page fault during execution of the one or more processes;

sending a message to the source device to retrieve missing data corresponding to the memory page fault and simultaneously map an empty memory page to a virtual address of the one or more processes that generated the memory page fault, wherein the message comprises the process identifier of the process that generated the memory page fault and one or more virtual addresses associated with the memory page fault;

retrieving, via the RDMA enabled network interface controller, the missing data from the source device corresponding to the memory page fault, wherein the source device translates the one or more virtual addresses associated with the memory page fault to physical addresses of the source device; and executing the one or more processes based on the missing data from the source device.

15. The method of claim 14, comprising modifying an operating system to include a page fault mechanism that generates a notification of the memory page fault.

16. The method of claim 14, comprising registering the empty memory page.

17. The method of claim 14, comprising marking the memory page fault as addressed in response to receiving the missing data from the source device.

18. The method of claim 14, comprising initiating a transmission protocol to receive the missing data associated with the one or more processes from the source device.

19. The method of claim 18, comprising determining a transmission connection corresponding to the transmission protocol and the process identifier for the one or more processes that generated the memory page fault.

20. The method of claim 14, wherein the system is a node in a supercomputer, a server providing a remote service, a desktop computer device, or a mobile device.

* * * * *